(12) United States Patent
Takamori et al.

(10) Patent No.: US 11,618,817 B2
(45) Date of Patent: Apr. 4, 2023

(54) METHOD FOR PRODUCING THERMOPLASTIC RESIN COMPOSITION AND THERMOPLASTIC RESIN COMPOSITION

(71) Applicant: INOAC CORPORATION, Nagoya (JP)

(72) Inventors: Yoshihisa Takamori, Anjo (JP); Kentaro Iwanaga, Anjo (JP)

(73) Assignee: INOAC CORPORATION, Nagoya (JP)

( * ) Notice: Subject to any disclaimer, the term of this patent is extended or adjusted under 35 U.S.C. 154(b) by 0 days.

(21) Appl. No.: 17/495,351

(22) Filed: Oct. 6, 2021

(65) Prior Publication Data

US 2022/0025170 A1 Jan. 27, 2022

Related U.S. Application Data

(62) Division of application No. 16/498,654, filed as application No. PCT/JP2018/011887 on Mar. 23, 2018, now Pat. No. 11,174,382.

(30) Foreign Application Priority Data

Mar. 29, 2017 (JP) .............................. JP2017-064300
Dec. 8, 2017 (JP) .............................. JP2017-235926

(51) Int. Cl.
*C08L 51/00* (2006.01)
*C08L 23/08* (2006.01)
(Continued)

(52) U.S. Cl.
CPC ......... *C08L 51/003* (2013.01); *C08L 23/0815* (2013.01); *C08L 23/12* (2013.01);
(Continued)

(58) Field of Classification Search
CPC .. C08L 23/12; C08L 23/0815; C08L 2205/22; C08L 2312/08; C08L 23/16
See application file for complete search history.

(56) References Cited

U.S. PATENT DOCUMENTS

| | | | |
|---|---|---|---|
| 4,311,628 A | 1/1982 | Abdou-Sabet et al. | |
| 5,298,211 A | 3/1994 | Hamanaka et al. | |

(Continued)

FOREIGN PATENT DOCUMENTS

| | | | |
|---|---|---|---|
| EP | 1050548 A1 * | 11/2000 | ............ C08F 255/02 |
| JP | 58-46138 B2 | 10/1983 | |

(Continued)

OTHER PUBLICATIONS

Written Opinion dated Jun. 19, 2018 issued by the International Searching Authority in International Application No. PCT/JP2018/011887 (PCT/ISA/237).

(Continued)

*Primary Examiner* — Mark S Kaucher
(74) *Attorney, Agent, or Firm* — Sughrue Mion, PLLC (57) ABSTRACT

It becomes possible to produce a thermoplastic resin composition having a sea-island structure by a kneading step of kneading a thermoplastic elastomer and/or rubber material having an alkoxysilyl group, in which the alkoxysilyl group is grafted to the thermoplastic elastomer and/or rubber material, and a thermoplastic resin in a melt state in a kneading machine and a dynamic crosslinking step of adding a water component into the kneading machine, forming a silanol group by a hydrolysis reaction of the alkoxysilyl group in the thermoplastic elastomer and/or rubber material having an alkoxysilyl group and the water component in the kneading machine, and subsequently forming a siloxane bond by a condensation reaction between the silanol groups.

13 Claims, 4 Drawing Sheets

(51) Int. Cl.
*C08L 23/12* (2006.01)
*C08L 83/06* (2006.01)

(52) U.S. Cl.
CPC ........... *C08L 83/06* (2013.01); *C08L 2203/30* (2013.01); *C08L 2207/04* (2013.01); *C08L 2312/00* (2013.01)

(56) References Cited

U.S. PATENT DOCUMENTS

| | | | |
|---|---|---|---|
| 5,672,660 | A | 9/1997 | Medsker et al. |
| 6,150,464 | A | 11/2000 | Medsker et al. |
| 2002/0151647 | A1 | 10/2002 | Laughner et al. |
| 2006/0178487 | A1 | 8/2006 | Weller |
| 2008/0023680 | A1 | 1/2008 | Inoue et al. |
| 2017/0349738 | A1 | 12/2017 | Chiba et al. |

FOREIGN PATENT DOCUMENTS

| | | |
|---|---|---|
| JP | 5-170930 A | 7/1993 |
| JP | 06-212035 A | 8/1994 |
| JP | 9-272741 A | 10/1997 |
| JP | 10-212389 A | 8/1998 |
| JP | 10-245424 A | 9/1998 |
| JP | 2000-273192 A | 10/2000 |
| JP | 2003-26875 A | 1/2003 |
| JP | 2003-26896 A | 1/2003 |
| JP | 2007-70602 A | 3/2007 |
| JP | 2016-20450 A | 2/2016 |
| WO | 2016/140253 A1 | 9/2016 |

OTHER PUBLICATIONS

International Search Report dated Jun. 19, 2018 issued by the International Searching Authority in International Application No. PCT/JP2018/011887 (PCT/ISA/210).

\* cited by examiner

Reaction of changing alkoxysilyl group grafted to thermoplastic elastomer formed of saturated bonds into silanol group (hydrolysis reaction)

———— : thermoplastic elastomer formed of saturated bonds

Reaction of changing silanol group into siloxane bond (dehydration condensation reaction)

FIG. 4

| | | | Example | | | | | | | | | | | | | | | | Comparative Example | | |
|---|---|---|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | 1 | 2 | 3 |
| TPE-1 | | | 100 | ← | ← | ← | ← | ← | ← | | | | | | | | | | | | |
| TPE-2 | | | | | | | | | | 100 | | | | 50 | 100 | ← | ← | ← | | | |
| TPE-3 | | | | | | | | | | | 100 | 100 | 100 | 50 | | | | | | | |
| Rubber-1 | | | | | | | | | | | | | | | | | | | EPDM /PP Phenol cross-linked TPV | EPDM /PP Phenol3 cross-linked TPV | EPDM /PP Peroxide cross-linked TPV |
| Rubber-2 | | | | | | | | | | | | | | | | | | | | | |
| Crosslinking agent | | | 1.5 | ← | ← | 1 | 1.5 | ← | ← | ← | ← | ← | ← | ← | ← | ← | ← | ← | | | |
| Reaction initiator | | | 0.1 | ← | ← | ← | 0.05 | 0.1 | ← | ← | ← | ← | ← | ← | ← | ← | ← | | | |
| Reaction terminator-1 | | | 0.1 | ← | 0.1 | 0.1 | ← | ← | ← | ← | ← | ← | ← | ← | ← | ← | ← | | | |
| Reaction terminator-2 | | | | | | | | | | | | | | | | | | | | | |
| Silanol crosslinking promoting catalyst | | | 0.06 | ← | ← | ← | ← | ← | ← | ← | ← | ← | ← | ← | ← | ← | ← | | | |
| Water | | | 1 | ← | ← | ← | ← | ← | ← | ← | ← | ← | ← | ← | ← | ← | ← | | | |
| Light stabilizer | | | | | | | | 0.3 | | | | | | | | | | | | | |
| Softening agent | | | | | | | | | 115 | | | | | | | | | | | | |
| TP-1 | | | 70 | ← | ← | ← | ← | ← | ← | ← | ← | ← | ← | ← | ← | ← | ← | | 70 | | |
| TP-2 | | | | | | | | | | | | | | | 70 | | | | | | |
| TP-3 | | | | | | | | | | | | | | | | 70 | | | | | |
| TP-4 | | | | | | | | | | | | | | | | | 70 | | | | |
| TP-5 | | | | | | | | | | | | | | | | | | 70 | | | |
| Coloring agent | | | 0.01 | ← | ← | ← | ← | ← | ← | ← | ← | ← | ← | ← | ← | ← | ← | | 0.01 | | |
| Phase inversion | Yes/No | | Yes | Yes | Yes | Yes | Yes | Yes | Yes | Yes | Yes | Yes | Yes | Yes | Yes | Yes | Yes | Yes | Yes | Yes | Yes |
| Sea-island structure | Yes/No | | Yes | Yes | Yes | Yes | Yes | Yes | Yes | Yes | Yes | Yes | Yes | Yes | Yes | Yes | Yes | Yes | Yes | No | No | No |
| Color difference value due to coloring | Relative to Example 1 | ΔE*ab | 0 | 3 | 4 | 5 | 4 | 5 | 5 | 5 | 4 | 4 | 5 | 4 | 4 | 4 | 4 | 6 | - | - | 6 |
| | Relative to Comparative Example 1 | | - | - | - | - | - | - | - | - | - | - | - | - | - | - | - | - | 0 | 0.3 | - |
| Gel fraction of island structure portion | Maximum value (theoretical value) | parts by weight | 100 | ← | ← | ← | ← | ← | ← | ← | ← | ← | ← | ← | ← | ← | ← | ← | 100 | 100 | 60 |
| | Measured value | parts by weight | 98 | 99 | 98 | 95 | 93 | 96 | 98 | 95 | 96 | 95 | 93 | 94 | 94 | 95 | 92 | 95 | 100 | 100 | 60 |
| | Gel fraction | % | 98 | 99 | 98 | 95 | 93 | 96 | 98 | 95 | 96 | 95 | 93 | 94 | 94 | 95 | 92 | 95 | 100 | 100 | 60 |
| Color difference value due to weatherable deterioration | | ΔE*ab | 2.3 | 2.4 | 2.8 | 2.4 | 2.5 | 2.1 | 2.7 | - | - | - | - | - | - | - | - | - | 13.2 | 14.2 | 12.5 |
| Compression set | | % | 30 | 30 | 29 | 36 | 37 | 30 | 35 | 40 | 39 | 34 | 36 | 40 | 38 | 33 | 34 | 35 | 33 | 35 | 52 |
| Remeltability | | Yes/No | ○ | ○ | ○ | ○ | ○ | ○ | ○ | ○ | ○ | ○ | ○ | ○ | ○ | ○ | ○ | ○ | ○ | ○ | × |

FIG. 5

| NBS unit | | Sense of color difference |
|---|---|---|
| 0.0 to 0.5 | Trace | Color difference is faintly felt |
| 0.5 to 1.5 | Slight | Color difference is slightly felt |
| 1.5 to 3.0 | Noticeable | Color difference is noticeably felt |
| 3.0 to 6.0 | Appreciable | Color difference is appreciably felt |
| 6.0 to 12 | Much | Color difference is much |
| 12 or more | Very Much | Color difference is very much | ns
METHOD FOR PRODUCING THERMOPLASTIC RESIN COMPOSITION AND THERMOPLASTIC RESIN COMPOSITION

CROSS REFERENCE TO RELATED APPLICATIONS

This application is a Divisional Application of U.S. application Ser. No. 16/498,654 filed Sep. 27, 2019, which is a National Stage of International Application No. PCT/JP2018/011887 filed Mar. 23, 2018, which claims priority to Japanese Patent Application No. 2017-064300 filed Mar. 29, 2017 and to Japanese Patent Application No. 2017-235926 filed Dec. 8, 2017, the entire contents of these applications being hereby incorporated by reference.

TECHNICAL FIELD

The present invention relates to a method for producing a thermoplastic resin composition which is excellent in mechanical properties and colorability and is capable of being molded through remelting, and a thermoplastic resin composition.

BACKGROUND ART

Thermoplastic elastomer compositions that are capable of being molded by extrusion molding or injection molding have been used for automobile parts such as a weather strip, a roof molding, and a mud guard, construction materials such as a water blocking material and a joint material, industrial members such as a hose, and the like.

Thermoplastic elastomer compositions include those in which polypropylene (PP), ethylene propylene diene rubber (EPDM), oils, crosslinking agents, and the like are blended and dynamic crosslinking is performed. In the case of complete crosslinking, a phenolic crosslinking agent is used as the crosslinking agent and, in the case of partial crosslinking, a peroxide crosslinking agent is used as the crosslinking agent (Patent Literatures 1 and 2).

In addition, there is a silanol-crosslinked resin in which a catalyst masterbatch such as tin is mixed with a masterbatch prepared from polyethylene (PE), a silane coupling agent, and a peroxide (reaction initiator), and the mixture is molded and is, in the subsequent crosslinking step, crosslinked with steam, moisture in the air, or the like (Patent Literature 3).

CITATION LIST

Patent Literature

Patent Literature 1: JP-A-5-170930
Patent Literature 2: JP-B-58-46138
Patent Literature 3: JP-A-10-245424

SUMMARY OF INVENTION

Technical Problem

However, a thermoplastic elastomer composition (TPV) dynamically crosslinked using a phenolic crosslinking agent is excellent in mechanical properties such as compression set due to complete crosslinking, but orange color resulting from phenol appears in molded articles and thus there is a problem that the degree of freedom in coloring is low. On the other hand, with regard to TPV dynamically crosslinked using a peroxide crosslinking agent, the peroxide crosslinking agent itself is colorless and transparent and the TPV has a high degree of freedom in coloring, but the TPV has a problem that it is inferior in mechanical properties because of partial crosslinking.

In addition, the silanol-crosslinked resin has problems that when once crosslinked, the resin cannot be remelted, cannot be remolded, and exhibits a low degree of freedom in molding.

The present invention has been made in view of the above-mentioned points, and an object thereof is to provide a method for producing a thermoplastic resin composition which is excellent in mechanical properties and colorability and is capable of being molded through remelting and a thermoplastic resin composition.

Solution to Problem (1) A method for producing a thermoplastic resin composition, comprising:
a kneading step of kneading a thermoplastic elastomer and/or rubber material having an alkoxysilyl group, in which the alkoxysilyl group is grafted to the thermoplastic elastomer and/or rubber material, and a thermoplastic resin in a melt state in a kneading machine; and
a dynamic crosslinking step of adding a water component into the kneading machine, forming a silanol group by a hydrolysis reaction of the alkoxysilyl group in the thermoplastic elastomer and/or rubber material having an alkoxysilyl group and the water component in the kneading machine, and subsequently forming a siloxane bond by a condensation reaction between the silanol groups,
wherein the thermoplastic resin composition obtained by the dynamic crosslinking step has a sea-island structure.
(2) The method for producing a thermoplastic resin composition according to (1), wherein in the dynamically crosslinking step,
when the alkoxysilyl group of the thermoplastic elastomer and/or rubber material having an alkoxysilyl group forms the siloxane bond passing through the silanol group,
a viscosity of the thermoplastic elastomer and/or rubber material having an alkoxysilyl group becomes larger than a viscosity of the thermoplastic resin,
the thermoplastic elastomer and/or rubber material having an alkoxysilyl group undergoes a phase transition to an island structure part of the sea-island structure, and
the thermoplastic resin undergoes a phase transition to a sea structure part of the sea-island structure.
(3) The method for producing a thermoplastic resin composition according to (1) or (2), wherein a gel fraction (in accordance with JIS K 6769: 2004/ISO-15875-2: 2003) of the island structure part of the sea-island structure is 90% or more.
(4) The method for producing a thermoplastic resin composition according to any one of (1) to (3), comprising:
in order to prepare the thermoplastic elastomer and/or rubber material having an alkoxysilyl group,
a grafting step of adding and kneading the thermoplastic elastomer and/or rubber material, a silane coupling agent and a reaction initiator, in a melt state in the kneading machine to graft the silane coupling agent to the thermoplastic elastomer and/or rubber material,
wherein the grafting step, the kneading step, and the dynamic crosslinking step are performed continuously in the kneading machine.
(5) The method for producing a thermoplastic resin composition according to any one of (1) to (4), wherein the sea structure part of the sea-island structure contains the thermoplastic resin and the sea structure part of the sea-island structure is remeltable.

(6) The method for producing a thermoplastic resin composition according to any one of (1) to (5), wherein a color difference value: ΔE*ab (in accordance with JIS Z 8781-4: 2013/ISO 11664-4: 2008) of the thermoplastic resin composition is 1.5 or more, wherein the color difference value is due to coloring of the thermoplastic resin composition in the case of blending 0.01 part by weight of a coloring agent relative to 100 parts by weight of the thermoplastic elastomer and/or rubber material.

(7) The method for producing a thermoplastic resin composition according to any one of (1) to (6), which comprises a thermoplastic resin-adding and kneading step of adding the thermoplastic resin into the kneading machine after the dynamic crosslinking step and kneading the thermoplastic resin and the thermoplastic resin composition obtained by the dynamic crosslinking step.

(8) The method for producing a thermoplastic resin composition according to any one of (1) to (7), wherein the thermoplastic resin is a crystalline thermoplastic resin.

(9) The method for producing a thermoplastic resin composition according to any one of (1) to (7), wherein the thermoplastic elastomer and/or rubber material is a thermoplastic elastomer in which the main chain and the side chains are formed of saturated bonds, and the thermoplastic resin is a thermoplastic resin in which the main chain and the side chains are formed of saturated bonds.

(10) The method for producing a thermoplastic resin composition according to (9), wherein the thermoplastic resin in which the main chain and the side chains are formed of saturated bonds is an olefin-based resin.

(11) The method for producing a thermoplastic resin composition according to (10), wherein the olefin-based resin is a polypropylene-based resin.

(12) The method for producing a thermoplastic resin composition according to any one of (9) to (11), wherein the thermoplastic elastomer in which the main chain and the side chains are formed of saturated bonds is an ethylene/α-olefin-based copolymer.

(13) The method for producing a thermoplastic resin composition according to any one of (9) to (12), wherein the color difference value: ΔE*ab (in accordance with JIS Z 8781-4: 2013/ISO 11664-4: 2008) of the thermoplastic resin composition after a weatherable deterioration is 0 or more and 3 or less.

(14) The method for producing a thermoplastic resin composition according to any one of (1) to (13), wherein the thermoplastic resin composition is used as a joint material for building materials, a water blocking material for building materials, an interior material for vehicles, an exterior material for vehicles, or an industrial hose material.

(15) A thermoplastic resin composition comprising a sea-island structure, wherein an island structure part of the sea-island structure contains a thermoplastic elastomer and/or rubber material cross-linked by a siloxane bond and a sea structure part of the sea-island structure contains a thermoplastic resin, and a gel fraction (in accordance with JIS K 6769: 2004/ISO-15875-2: 2003) of the island structure part is 90% or more.

(16) The thermoplastic resin composition according to (15), wherein the thermoplastic elastomer and/or rubber material is a thermoplastic elastomer in which the main chain and the side chains are formed of saturated bonds, and the thermoplastic resin is a thermoplastic resin in which the main chain and the side chains are formed of saturated bonds.

Advantageous Effects of Invention

According to the above (1), since dynamic crosslinking is performed using a silane coupling agent, there is obtained a thermoplastic resin composition which has good mechanical properties and colorability, furthermore is capable of being remelted and remolded, and has a high degree of freedom in molding.

According to the above (9), since a thermoplastic elastomer in which the main chain and the side chains are formed of saturated bonds and a thermoplastic resin in which the main chain and the side chains are formed of saturated bonds are used as raw materials and dynamic crosslinking is performed using a silane coupling agent, there is obtained a thermoplastic resin composition which is excellent in mechanical properties and colorability and is capable of being remelted and remolded, and has a high degree of freedom in molding and, in addition, hardly causes a weatherable deterioration.

According to the above (15), since the island structure part of a thermoplastic resin composition having a sea-island structure contains a thermoplastic elastomer and/or rubber material crosslinked with a siloxane bond and the sea structure part contains a thermoplastic resin, there is obtained a thermoplastic resin composition which has good mechanical properties and colorability, furthermore is capable of being remelted and remolded, and has a high degree of freedom in molding.

According to the above (16), since the island structure part of a thermoplastic resin composition having a sea-island structure contains a thermoplastic elastomer crosslinked with the siloxane bond in which the main chain and the side chains are formed of saturated bonds and the sea structure part contains a thermoplastic resin in which the main chain and the side chains are formed of saturated bonds, there is obtained a thermoplastic resin composition which is excellent in mechanical properties and colorability and is capable of being remelted and remolded, and has a high degree of freedom in molding and, in addition, hardly causes a weatherable deterioration.

DESCRIPTION OF EMBODIMENTS

Hereinafter, embodiments of the present invention will be described. The method for producing a thermoplastic resin composition of the present embodiment has a kneading step and a dynamic crosslinking step, and may have a thermoplastic resin-adding and kneading step after the dynamic crosslinking step.

In the kneading step, the thermoplastic elastomer and/or rubber material having an alkoxysilyl group in which an alkoxysilyl group is grafted to the thermoplastic elastomer and/or rubber material, and the thermoplastic resin are kneaded in a melt state in a kneading machine.

The thermoplastic elastomer (TPE) to be used in this embodiment is not limited, and, for example, styrene-based thermoplastic elastomers (TPS), hydrogenated styrene-based thermoplastic elastomers (e.g., hydrogenated styrene ethylene propylene-based copolymer (SEP), hydrogenated styrene ethylene propylene styrene-based copolymer (SEPS), hydrogenated styrene ethylene butadiene-based copolymer (SEBS), etc.), olefin-based thermoplastic elastomers (TPO), polymerization-type thermoplastic polyolefin-based elastomers (R-TPO)), vinyl chloride-based thermoplastic elastomers (TPVC), polyurethane-based thermoplastic elastomers (TPU), polyester-based thermoplastic elastomers (TPC), polyamide-based thermoplastic elastomers (TPA), polybutadiene-based thermoplastic elastomers, fluorine-based thermoplastic elastomers (TPF), and the like can be used, and one or two or more kind(s) thereof can be used in combination.

The thermoplastic elastomer includes a thermoplastic elastomer in which the main chain and the side chains are formed of saturated bonds, and the thermoplastic elastomer in which the main chain and the side chains are formed of saturated bonds is a thermoplastic elastomer that does not contain an unsaturated bond such as a double bond in the main chain and the side chains. As the thermoplastic elastomer in which the main chain and the side chains are formed of saturated bonds, there may be mentioned polymerization-type thermoplastic polyolefin-based elastomers (R-TPO)), polyvinyl chloride-based thermoplastic elastomers (TPVC), fluorine-based thermoplastic elastomers (TPF), and the like, and one kind thereof can be used, or two or more kinds thereof can be used in combination. In particular, the polymerization-type thermoplastic polyolefin-based elastomers are preferable, and specifically, an ethylene/α-olefin copolymer elastomer is mentioned. The copolymer portion of the ethylene/α-olefin copolymer may be either a random copolymer or a block copolymer.

The rubber material to be used in the present embodiment is not limited, and, for example, natural rubber (NR), isoprene rubber (IR), butadiene rubber (BR), styrene butadiene rubber (SBR), butyl rubber (IIR), nitrile rubber (NBR), ethylene propylene rubber (EPM), ethylene propylene diene rubber (EPDM), chloroprene rubber (CR), acrylic rubber (ACM), and the like can be used, and one or two or more kind(s) thereof can be used in combination. In the rubber materials, rubber materials that do not contain an unsaturated bond such as a double bond in the main chain are preferable, and ethylene propylene-based rubber (EPM, EPDM), acrylic rubber (ACM), etc. may be mentioned. One kind thereof can be used, or two or more kinds thereof can be used in combination.

In the present embodiment, either one of the thermoplastic elastomer and the rubber material is used alone or both of them are used in combination.

Further, in the case of preparing the thermoplastic elastomer and/or rubber material having an alkoxysilyl group (in the case of using the thermoplastic elastomer in which the main chain and the side chains are formed of saturated bonds, the thermoplastic elastomer having an alkoxysilyl group and formed of saturated bonds, the same shall apply hereinafter), the grafting step is performed before the kneading step.

In the grafting step, the thermoplastic elastomer and/or rubber material, a silane coupling agent, a reaction initiator and an appropriate additive are added, and then are kneaded in a melt state in a kneading machine. Thereby, the thermoplastic elastomer composed of the thermoplastic elastomer and/or rubber material having an alkoxysilyl group is prepared.

The silane coupling agent is used as a crosslinking agent and is preferably a silane coupling agent having an alkoxysilyl group. As the silane coupling agent having an alkoxysilyl group, there may be mentioned an alkoxysilyl compound having a vinyl group, an alkoxysilyl compound having an epoxy group, an alkoxysilyl compound having an acryl group or a methacryl group, etc. and one kind thereof can be used, or two or more kinds thereof can be used in combination. In particular, the alkoxysilyl compound having a vinyl group is more preferable because the compound has good reactivity with the thermoplastic elastomer and/or rubber material and is inexpensive. Specific examples of the alkoxysilyl compound having a vinyl group include vinyltrimethoxysilane, vinyltriethoxysilane, and the like. The blending amount of the silane coupling agent is preferably 0.1 to 3 parts by weight relative to 100 parts by weight of the thermoplastic elastomer and/or rubber material.

As the reaction initiator, dialkyl peroxide-based ones, diacyl peroxide-based ones, alkyl perester-based ones, and the like may be mentioned, and one kind thereof can be used, or two or more kinds thereof can be used in combination. In particular, dialkyl peroxide-based ones are preferable from the viewpoint of the reactivity with the thermoplastic resin composition and the cost, and specifically, dicumyl peroxide, 2,5-dimethyl-2,5-di (t-butylperoxy)hexyne-3, 2,5-dimethyl-2,5-di (t-butylperoxy)hexane, and the like may be mentioned. The blending amount of the reaction initiator is preferably 0.01 to 0.5 parts by weight relative to 100 parts by weight of the thermoplastic elastomer and/or rubber material.

Furthermore, it is preferable to blend a silanol crosslinking promoting catalyst. As the silanol crosslinking promoting catalyst, dibutyltin, fatty acid amides, and the like may be mentioned, and one kind thereof can be used, or two or more kinds thereof can be used in combination. The blending amount of the silanol crosslinking promoting catalyst is preferably 0.001 to 0.5 parts by weight relative to 100 parts by weight of the thermoplastic elastomer and/or rubber material.

As the appropriate additives, there may be mentioned reaction terminators, synthetic resin stabilizers such as light stabilizers and antioxidants, processing aids such as lubricants and mold releasing agents, softeners, coloring agents, filling materials (fillers), conductive agents, flame retardants, etc., and they can be blended in the range where the characteristic of the above-mentioned thermoplastic resin composition is not affected. The reaction initiator, the silanol crosslinking promoting catalyst, and the appropriate additives may be appropriately mixed into the kneading machine in each step of the kneading step, the dynamic crosslinking step, and the thermoplastic resin-adding and kneading step in addition to the grafting step.

As the reaction terminator (radical scavenger), there may be mentioned compounds capable of radical scavenging, such as phenolic antioxidants and hindered amine-based light stabilizers, and one kind thereof can be used, or two or more kinds thereof can be used in combination. The hindered amine-based light stabilizer is more preferable because the hindered amine-based light stabilizer itself is colorless and excellent in the ability to scavenge radicals. In the case where a phenolic antioxidant is used, there is a grade where the phenolic antioxidant itself is colored, and even if it is a grade where it is not colored, there is a grade where it is colored at the time of processing in a kneading machine or the like, so that it is preferable to select a grade where it is not colored even when processed in a kneading machine or the like. In the case of using a grade where it is colored or a grade where it is colored at the time of processing, it is preferable to use a blending amount that does not affect the colorability of the thermoplastic resin composition. The blending amount of the reaction terminator is preferably 0.01 to 3 parts by weight relative to 100 parts by weight of the thermoplastic elastomer and/or rubber material.

As the synthetic resin stabilizers such as light stabilizers and antioxidants, phenolic antioxidants and hindered amine-based light stabilizers may be mentioned, and one kind thereof can be used, or two or more kinds thereof can be used in combination. By blending the synthetic resin stabilizer, the stability (a weatherable deterioration and the like) of the thermoplastic resin composition can be further enhanced. As the synthetic resin stabilizer, the same compound as the reaction terminator can be used. The blending amount of the synthetic resin stabilizer is preferably 0.01 to 3 parts by weight relative to 100 parts by weight of the thermoplastic elastomer and/or rubber material.

As the processing aids such as lubricants and mold release agents, metal soaps such as erucic acid amides and calcium stearate may be mentioned, and one kind thereof can be used, or two or more kinds thereof can be used in combination. By blending the processing aid, the discharge of the thermoplastic resin composition can be stabilized at the outlet of a kneading machine such as an extruder, and melt fracture can be prevented. The blending amount of the processing aid is preferably 0.01 to 1 part by weight relative to 100 parts by weight of the thermoplastic elastomer and/or rubber material.

As the softeners, paraffin-based oil, olefin-based oil, naphthene-based oil, aromatic oil, and the like may be mentioned, and one kind thereof can be used, or two or more kinds thereof can be used in combination. Since the oil itself is colored pale yellow or the like in case of the naphthene-based oil and the aromatic oil, it is more preferable to use paraffin-based oil or olefin-based oil which is colorless. The blending amount of the softener can be appropriately adjusted according to the target hardness, and is preferably 0 to 150 parts by weight relative to 100 parts by weight of the thermoplastic elastomer and/or rubber material.

As the coloring agents, coloring materials such as pigments of various colors may be mentioned, and color can be adjusted using one thereof or two or more thereof in combination. The coloring agent may be directly blended in the kneading machine, but it is preferable to use a masterbatch which is excellent in dispersibility and homogeneous and does not cause scattering or staining of the kneading machine. The blending amount of the coloring agent is preferably 0.001 to 3 parts by weight relative to 100 parts by weight of the thermoplastic elastomer and/or rubber material, although it depends on the desired color.

The thermoplastic resin (TP) to be mixed in the kneading step may be either crystalline or amorphous, or both may be used in combination. As the crystalline thermoplastic resin, there may be mentioned olefin-based resins (PO), polyacetal resins (POM), polyamide-based resins (PA), polyester-based resins (polyethylene terephtalate (PET), polybutylene terephthalate (PBT), etc.), and the like, as the amorphous thermoplastic resin, there may be mentioned polystyrene-based resins (PS), polycarbonate-based resins (PC), polyvinyl chloride-based resins (PVC), etc., and one kind thereof can be used, or two or more kinds thereof can be used in combination. The blending amount of the thermoplastic resin is preferably 30 to 300 parts by weight, and more preferably 50 to 200 parts by weight relative to 100 parts by weight of the thermoplastic elastomer and/or rubber material.

The thermoplastic resin includes a thermoplastic resin in which the main chain and the side chains are formed of saturated bonds, and the thermoplastic resin in which the main chain and the side chains are formed of saturated bonds is a thermoplastic resin that does not contain an unsaturated bond such as a double bond in the main chain and side chains. As the crystalline thermoplastic resins in which the main chain and the side chains are formed of saturated bonds, there may be mentioned olefin-based resins, polyacetal-based resins, and the like, and as the amorphous thermoplastic resins in which the main chain and the side chains are formed of saturated bonds, there may be mentioned polyvinyl chloride-based resins. Moreover, in the case of using an olefin-based resin, a polypropylene-based resin is preferably used.

As the thermoplastic resin to be mixed in the kneading step, a crystalline thermoplastic resin is preferable. This is because, in the kneading step, the thermoplastic elastomer and/or rubber material having an alkoxysilyl group and the thermoplastic resin are in a melt state, and in the subsequent dynamic crosslinking step, when the alkoxysilyl group of the thermoplastic elastomer and/or rubber material forms a siloxane bond, a crystalline thermoplastic resin having a clear melting point (Tm) generates a viscosity difference as compared to an amorphous thermoplastic resin having non-clear melting point and hence a phase transition is likely to occur.

Since the thermoplastic resin mixed in the kneading step is kneaded with a water component in the subsequent dynamic crosslinking step, in the case of using a hydrolyzable thermoplastic resin (PA, PBT, etc.), it is preferable to consider the influence of the hydrolysis. This is because the molecular weight of the thermoplastic resin is reduced by the hydrolysis reaction, and hence it is also possible to obtain a thermoplastic resin composition having improved fluidity and having mechanical properties such as low rigidity and buckling.

In the case of using a crystalline thermoplastic resin in which the main chain and the side chains are formed of saturated bonds as the thermoplastic resin to be mixed in the kneading step, hydrolysis of the thermoplastic resin does not occur in the dynamic crosslinking step, and further, since the main chain and side chains do not contain an unsaturated bond such as a double bond, it is possible to obtain a thermoplastic resin composition that hardly causes a weatherable deterioration. As the crystalline thermoplastic resin in which the main chain and the side chains are formed of saturated bonds, olefin-based resins, polyacetal-based resins, and the like may be mentioned, and one kind thereof can be used, or two or more kinds thereof can be used in combination. As the olefin-based resin (PO), a polyethylene-based resin (PE), a polypropylene-based resin (PP), a polybutene-based resin (PB), and the like may be mentioned. Among the above-mentioned olefin-based resins, from the viewpoint of heat resistance and moldability of the thermoplastic resin composition, a polypropylene-based resin is particularly preferable, and may be any of homopolymer (homo PP) and a copolymer (random PP, block PP).

Incidentally, in the case of using a hydrolysable thermoplastic resin as the thermoplastic resin and obtaining a thermoplastic resin composition having high mechanical properties, the thermoplastic resin is preferably mixed while dividing the mixing amount of the thermoplastic resin relative to 100 parts by weight of the thermoplastic elastomer and/or rubber material into the mixing step and the thermoplastic resin-adding and kneading step that is performed in a later step. In the thermoplastic resin-adding and kneading step, the water component mixed in the dynamic crosslinking step is consumed by the hydrolysis reaction or released to the outside of the kneading machine through a vent or the like, and thus does not exist in the kneading machine. Therefore, the hydrolysis of the added hydrolyzable thermoplastic resin does not occur, and a thermoplastic resin composition having high mechanical properties can be obtained.

In the kneading step, in the kneading machine, the thermoplastic elastomer and/or rubber material having an alkoxysilyl group, the thermoplastic resin, and an appropriate additive are added and kneaded in a melt state.

In the dynamic crosslinking step, the water component is added and kneaded. The mixing of the water component into the kneading machine may be carried out directly as a liquid, or a mixture containing the water component which may be prepared by mixing with a filling material (filler), a water-absorbable polymer, or the like, and the prepared mixture may be blended. In addition, a compound that releases a water component from the compound upon heating or the like, that is a compound containing crystalline water (such as an organic compound, an inorganic compound, or a mixture of an organic compound and an inorganic compound), a hydroxide, or the like, may be blended. They can be used with one kind, or two or more kinds thereof can be used in combination. Incidentally, the water component is evaporated when the water component is mixed into a heated kneading machine, and therefore, it is preferable to blend the component in about 1 to 10 times the theoretical blending amount necessary for changing the alkoxysilyl group into a silanol group. The blending amount of the water component is preferably 0.1 to 10 parts by weight relative to 100 parts by weight of the thermoplastic elastomer and/or rubber material.

Figure 3A:
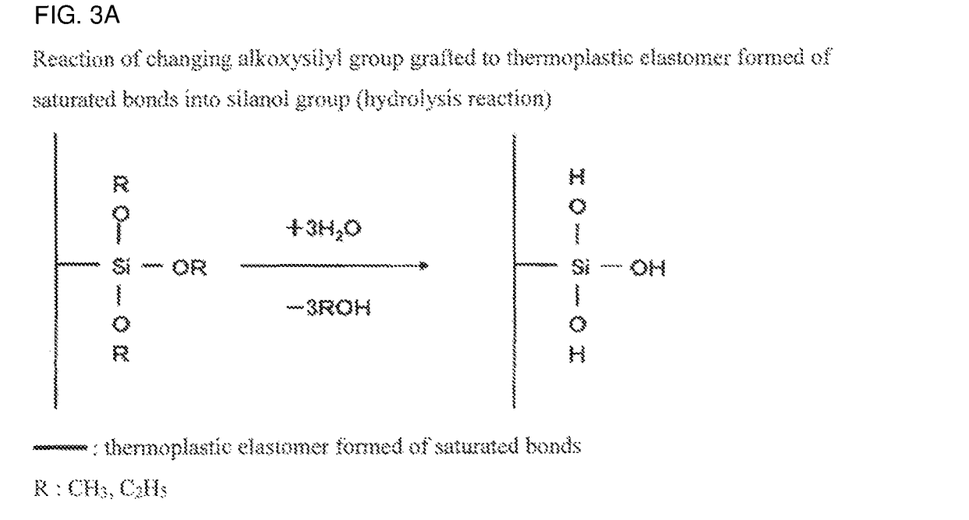
FIG. 3A and FIG. 3B show the reaction behavior at the time when an alkoxy silyl group is changed into a siloxane bond passing through a silanol group.
Figure 3B:
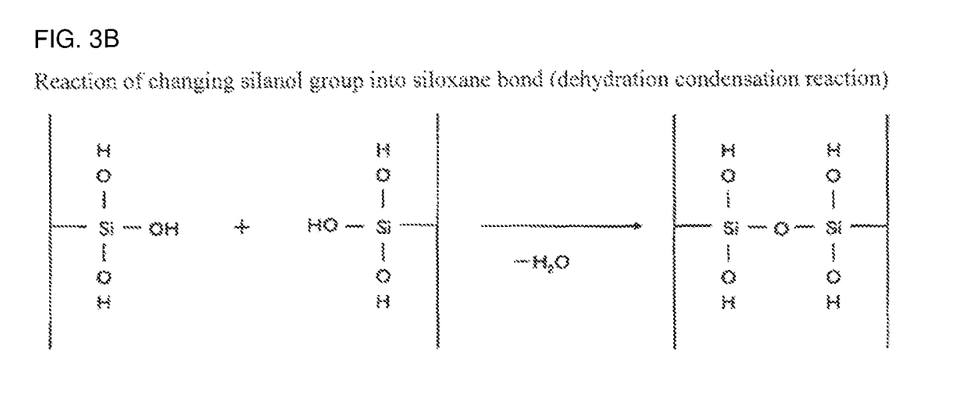

In the dynamic crosslinking step, a hydrolysis reaction is caused by contacting the alkoxysilyl group of the thermoplastic elastomer and/or rubber material having an alkoxysilyl group with a water component wherein the thermoplastic elastomer and/or rubber material has so far formed the sea structure part of the sea-island structure, and thus, the alkoxysilyl group is changed into a silanol group. Subsequently, a siloxane bond is formed by the condensation reaction (dehydration condensation reaction) between the silanol groups. The alkoxysilyl group is converted into a silanol group by the hydrolysis reaction, and the silanol group is further subjected to the condensation reaction to form a siloxane bond, whereby a viscosity of the thermoplastic elastomer and/or rubber material having an alkoxysilyl group is made higher than a viscosity of the thermoplastic resin and hence a phase transition to an island structure part occurs. On the other hand, in the thermoplastic resin which has so far formed the island structure part of the sea-island structure, a phase transition to a sea structure part occurs. In the dynamic crosslinking step, the thermoplastic elastomer and/or rubber material having an alkoxysilyl group undergoes a phase transition from the sea structure part to the island structure part, and the thermoplastic resin undergoes a phase transition from the island structure part to the sea structure part. Thus, the thermoplastic elastomer and/or rubber material having an alkoxysilyl group and the thermoplastic resin are reversed in phase. Thereby, the above-mentioned thermoplastic resin composition is obtained. FIG. 3A and FIG. 3B show a reaction behavior until an alkoxysilyl group forms a siloxane bond passing through a silanol group in the case of the thermoplastic elastomer having an alkoxysilyl group and formed of saturated bonds.

The thermoplastic resin-adding and kneading step is preferably performed in the case of using a hydrolyzable thermoplastic resin (PA, PBT, or the like) as the thermoplastic resin. In the dynamic crosslinking step, due to the water component mixed in, a part of the hydrolyzable thermoplastic resin mixed in the kneading step causes a decrease in molecular weight and the like due to a hydrolysis reaction with the water component. However, when the hydrolyzable thermoplastic resin is further added in the thermoplastic resin-adding and kneading step, it becomes possible to reduce the influence of the hydrolysis reaction. Even when the hydrolyzable thermoplastic resin is further added in the thermoplastic resin-adding and kneading step, the thermoplastic elastomer and/or rubber material has already formed the island structure part of the sea-island structure by the dynamic crosslinking step in the previous dynamic crosslinking step, and no influence is observed on the island structure part.

In particular, polyamide-based resins and polyester-based resins (PET, PBT, etc.) are hydrolysable, but are excellent in mechanical properties and have a high melting point as compared with olefin-based resins and the like, and thus a thermoplastic resin composition excellent in mechanical properties and heat resistance can be obtained.

In the thermoplastic resin-adding and kneading step, a thermoplastic resin is added to the thermoplastic resin composition after the dynamic crosslinking step and is kneaded. The thermoplastic resin to be added in the thermoplastic resin-adding and kneading step is not limited to the same type as the type of the thermoplastic resin mixed in the kneading step, and may be a different type of thermoplastic resin. The ratio of the thermoplastic resin to be mixed in the thermoplastic resin-adding and kneading step is appropriately determined according to the characteristics of the target thermoplastic resin composition, but the ratio is preferably 15 to 80%, more preferably 40 to 80%, and particularly preferably 50 to 80% relative to the mixing amount of the thermoplastic resin (total mixing amount) relative to 100 parts by weight of the thermoplastic elastomer and/or rubber material.

The thermoplastic resin composition is formed into pellets, and made into automobile parts, water blocking materials, construction materials, industrial members, and the like by known resin molding such as extrusion molding and injection molding. For example, it is used as a joint material for building materials or a water blocking material for building materials, an interior material for vehicles, an exterior material for vehicles, and an industrial hose material.

Figure 1:
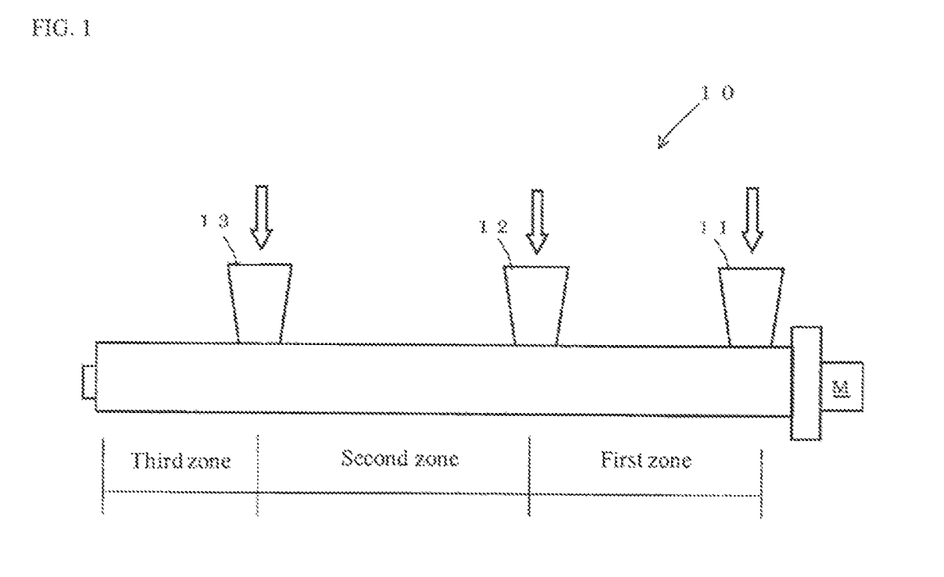
FIG. 1 is a schematic view of a kneading machine in which a grafting step, a kneading step, and a dynamic crosslinking step are performed continuously.

The kneading machine 10 shown in FIG. 1 is a kneading machine in which the grafting step, the kneading step, and the dynamic crosslinking step can be performed continuously in one kneading machine, and is a kneading machine suitable for the method for producing a thermoplastic resin composition of the present embodiment. As the kneading machine, a single-screw extruder, a twin-screw extruder, a kneading machien, or the like can be used. In particular, in point of reactive extrudability and self-cleaning properties, a twin-screw extruder is preferable. In the present embodiment, explanation is performed using a twin-screw extruder as an example.

The kneading machine 10 is provided, from the upstream side to the downstream side, with a first zone where the grafting step is performed, a second zone where the kneading step is performed, and a third zone where the dynamic crosslinking step is performed, has a structure where a screw provided inside the cylinder is rotated by a motor M, and the kneaded material is sequentially transferred to the downstream side (first zone→second zone→third zone).

In the cylinder, a first supply port 11 is provided in the first zone where the grafting process is performed, a second supply port 12 is provided in the second zone where the kneading process is performed, and a third supply port 13 is provided in the third zone where the dynamic crosslinking process is performed.

The production of the thermoplastic resin composition performed using the kneading machine 10 will be described. From the first supply port 11, the thermoplastic elastomer and/or rubber material, the silane coupling agent, the reaction initiator, and the silanol crosslinking promoting catalyst and an appropriate additive which are appropriately blended, are supplied into the cylinder and are melt-kneaded in the first zone where the grafting step is performed. The alkoxysilyl group is grafted to the thermoplastic elastomer and/or rubber material by kneading in the first zone to prepare the thermoplastic elastomer and/or rubber material having an alkoxysilyl group, which is transferred to the subsequent second zone.

In the second zone where the kneading step is performed, the thermoplastic resin and an appropriate additive are supplied into the cylinder from the second supply port 12 and melt-kneaded, and the kneaded material is sent to the next third zone.

In the third zone where the dynamic crosslinking step is performed, the water component is supplied into the cylinder from the third supply port 13 and melt-kneaded. In the kneading in the third zone, a silanol group is formed by a hydrolysis reaction of the alkoxysilyl group of the thermoplastic elastomer and/or rubber material having an alkoxysilyl group with the water component, and then forming a siloxane bond by a dehydration condensation reaction between the silanol groups. By changing the alkoxysilyl group of the thermoplastic elastomer and/or rubber material having an alkoxysilyl group into a siloxane bond, a viscosity of the thermoplastic elastomer and/or rubber material having an alkoxysilyl group is made higher than a viscosity of the thermoplastic resin. The thermoplastic elastomer and/or rubber material having an alkoxysilyl group which has so far formed the sea structure part of the sea-island structure undergoes a phase transition to the island structure part, and the thermoplastic resin which has so far formed the island structure part of the sea-island structure undergoes a phase transition to the sea structure part. The thermoplastic resin composition is obtained by the phase inversion of the thermoplastic elastomer and/or rubber material having an alkoxysilyl group and the thermoplastic resin. The thermoplastic resin composition extruded from the kneading machine 10 is then pelletized by a pelletizer and is used for resin molding such as extrusion molding or injection molding.

Figure 2:
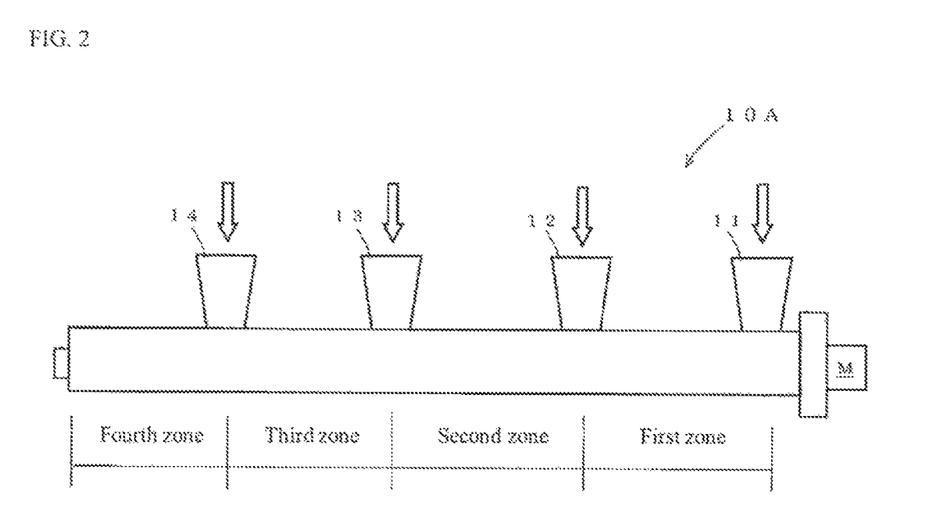
FIG. 2 is a schematic view of a kneading machine in which a grafting step, a kneading step, a dynamic crosslinking step, and a thermoplastic resin-adding and kneading step are performed continuously.

The kneading machine 10A shown in FIG. 2 is a kneading machine which is provided with a fourth zone where the thermoplastic resin-adding and kneading step is performed, next to the third zone where the dynamic crosslinking step is performed in the kneading machine 10 of FIG. 1 and thus makes it possible to perform the grafting step, the kneading step, the dynamic crosslinking step, and the thermoplastic resin-adding and kneading step continuously in one kneading machine, and is a kneading machine suitable for the method for producing the thermoplastic resin composition according to the present embodiment. Incidentally, with regard to the component parts similar to the kneading machine 10 of FIG. 1, the same numerals and signs as those of the kneading machine 10 of FIG. 1 were attached. The kneading machine 10A shown in FIG. 2 has a structure that a screw provided inside the cylinder is rotated by a motor M and the kneaded material are sequentially transferred to the downstream side (first zone→second zone→third zone→fourth zone). A fourth supply port 14 is provided in the fourth zone where the thermoplastic resin-adding and kneading step is performed, and the thermoplastic resin is supplied to the fourth zone from the fourth supply port and is kneaded. The thermoplastic resin composition kneaded in the fourth zone is then pelletized by a pelletizer and used for resin molding such as extrusion molding or injection molding.

The thermoplastic elastomer and/or rubber material having an alkoxysilyl group which was obtained by performing the grafting step in advance, may be stored. The thermoplastic resin composition having the sea-island structure may be prepared through the kneading step and the dynamic crosslinking step or further through the thermoplastic resin-adding and kneading step by using the stored thermoplastic elastomer and/or rubber material having an alkoxysilyl group at a later date.

The thermoplastic resin composition of the present embodiment may be prepared by using a method other than the above-mentioned production method. For example, first, using the kneading machine 10, a thermoplastic elastomer and/or rubber material having an alkoxysilyl group in which a silane coupling agent is grafted to a thermoplastic elastomer and/or rubber material is prepared. Next, it is molded into a plate or the like, a water component is added, and the alkoxysilyl group of the thermoplastic elastomer and/or rubber material having an alkoxysilyl group and the water component are subjected to a hydrolysis reaction to form a silanol group. Then, a thermoplastic resin composition crosslinked by a siloxane bond is prepared by a dehydration condensation reaction between the silanol groups. In that case, the gel fraction of the thermoplastic resin composition crosslinked by the siloxane bond is made 90% or more (complete crosslinking). Thereafter, the thermoplastic resin composition crosslinked by the siloxane bond is made fine by pulverization or the like. For pulverization, a known pulverizer can be used, and the thermoplastic resin composition crosslinked by the siloxane bond may be frozen in advance and freeze-pulverized, or may be pulverized at room temperature.

Then, using the kneading machine 10, the thermoplastic resin in a melt state and the finely pulverized thermoplastic resin composition crosslinked by the siloxane bond can be kneaded and extruded to obtain the thermoplastic resin composition of the present embodiment. After extrusion, it may be pelletized by a pelletizer and used for resin molding such as extrusion molding or injection molding. The thermoplastic resin composition obtained by using the above-mentioned production method is excellent in mechanical properties and colorability and has a sea-island structure that is capable of molding through remelting since the remeltable thermoplastic resin constitutes a sea structure part of the sea-island structure and the finely pulverized thermoplastic resin composition crosslinked by the siloxane bond constitutes an island structure part of the sea-island structure.

Further, in the thermoplastic resin composition of the present embodiment, the gel fraction (in accordance with JIS K 6769: 2004/ISO-15875-2: 2003) of the island structure part of the sea-island structure is preferably 90% or more. Moreover, the color difference value: ΔE*ab (in accordance with JIS Z 8781-4: 2013/ISO 11664-4: 2008) is preferably 1.5 or more, wherein the color difference value is due to coloring of the thermoplastic resin composition of the present embodiment in the case of blending 0.01 part by weight of a coloring agent relative to 100 parts by weight of the thermoplastic elastomer and/or rubber material. In addition, the color difference value: ΔE*ab (in accordance with JIS Z 8781-4: 2013/ISO 11664-4: 2008) after a weatherable deterioration of the thermoplastic resin composition of the present embodiment is preferably 0 or more and 3 or less.

EXAMPLES

Figure 4:
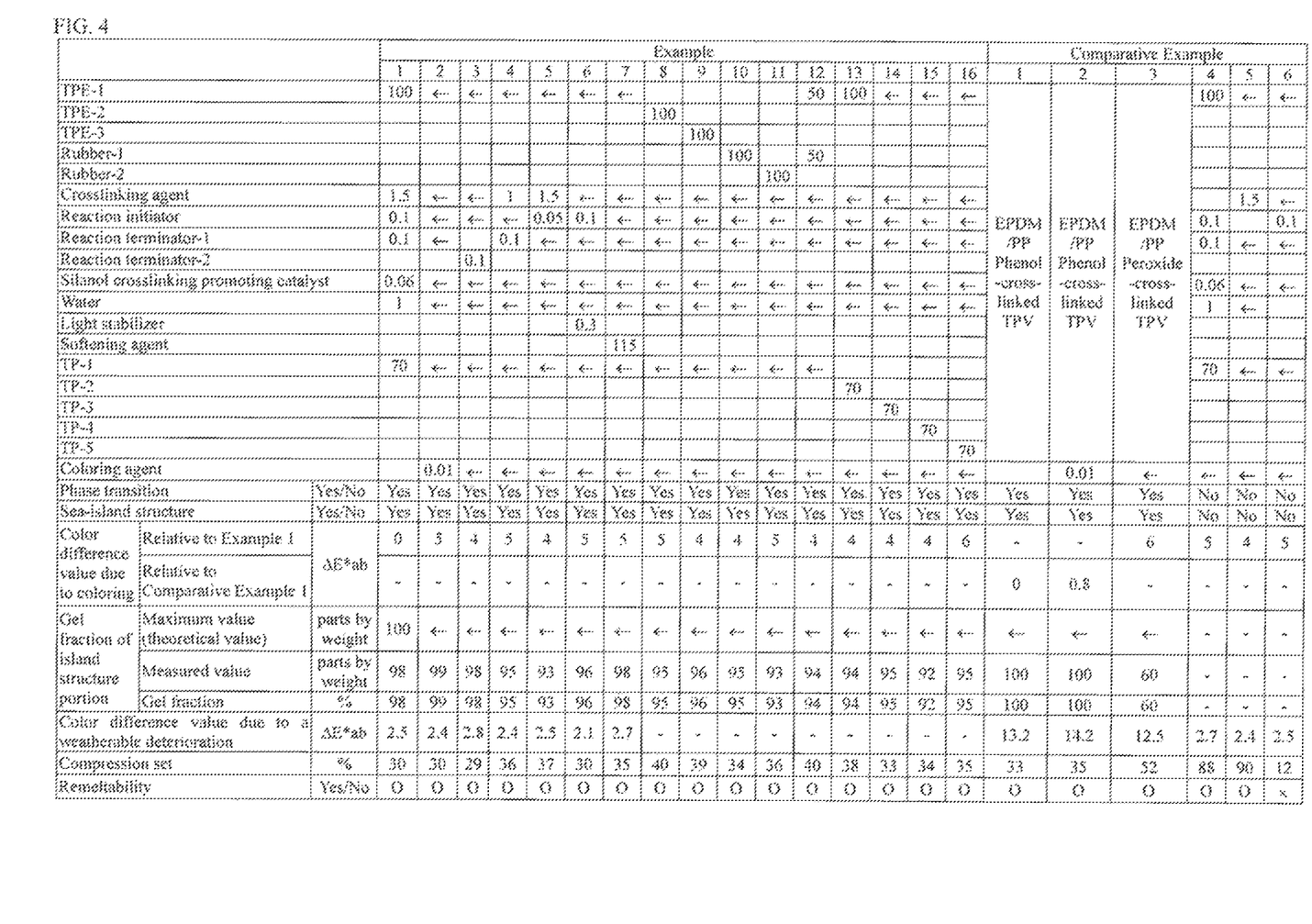
FIG. 4 is a table which shows compositions and physical-property measurement results of Examples and Comparative Examples.

Using the following raw materials, the compositions of Examples 1 to 16 and Comparative Examples 1 to 6 having the compositions of FIG. 4 were produced in a kneading machine. The numerals of individual components in the compositions of FIG. 4 are shown as parts by weight. Further, Product name: Santoprene 201-64: manufactured by Exxon Mobil Co. for Comparative Examples 1 and 2, and Product name: MILASTOMER 7030N: manufactured by Mitsui Chemicals, Inc. for Comparative Example 3 were used. The kneading machine used was a twin-screw extruder (L/D=72), in Examples 1 to 13 and 16 and Comparative Examples 1 to 6, the kneading machine 10 having first to third zones was used, and in Examples 14 to 15, the kneading machine 10A having first to fourth zones was used.

With regard to the production conditions in the case of using the kneading machine 10, production was performed as follows: temperature of the first zone: 230° C., temperature of the second and third zones: 200° C. for Examples 1 to 12 and 16 and Comparative Examples 1 to 6, and temperature of the first zone: 230° C., temperature of the second and third zones: 230° C. for Example 13, screw rotation speed: 400 rpm, and discharge amount at the outlet: 30 kg/hr.

Further, with regard to the production conditions in the case of using the kneading machine 10A, production was performed as follows: temperature of the first zone: 230° C., temperature of the second and third zones: 270° C., temperature of the fourth zone 270° C. for Example 14, and temperature of the first zone: 230° C., temperature of the second and third zones: 250° C., temperature of the fourth zone 250° C. for Example 15, screw rotation speed: 400 rpm, and discharge amount at the outlet: 30 kg/hr.

Incidentally, the temperature of the first zone is appropriately set according to the melting points of the raw materials to be used (thermoplastic elastomer, rubber material, etc.) and the degradation temperature of the reaction initiator to be used and therefore is preferably 200 to 250° C. as a guideline of the temperature range. The temperatures of the second and third zones and the fourth zone are preferably set to a temperature 10 to 30° C. higher than the melting points of the raw materials (thermoplastic resin etc.) to be used. As a guideline of the temperature range, the temperature is 180 to 230° C. in the case of TP-1 and TP-5, is 200 to 260° C. in the case of TP-2, is 240 to 300° C. in the case of TP-3, and is 220 to 280° C. in the case of TP-4.

TPE-1 (olefin-based one): Ethylene/1-octene copolymer, manufactured by Dow Chemical Co., product name: ENGAGE 8842

TPE-2 (styrene-based one): Hydrogenated styrene-based thermoplastic elastomer (SEBS), manufactured by Clayton Polymer Japan, Inc., product name: G1651

TPE-3 (polyester-based one): Polyester-based thermoplastic elastomer manufactured by Toyobo Co., Ltd., product name: P-40B Rubber-1: Ethylene propylene diene rubber (EPDM), manufactured by Dow Chemical Japan Ltd., product name: NORDEL IP 4760P Rubber-2: Acrylic rubber, manufactured by Unimatec Co., Ltd., product name: A5098

Crosslinking agent (silane coupling agent): Vinyltrimethoxysilane, manufactured by Shin-Etsu Chemical Co., Ltd., Product name: KBM-1003

Reaction initiator: Aliphatic organic peroxide, manufactured by NOF Corporation, product name: Perhexa 25B Reaction terminator-1: Phenolic antioxidant, manufactured by BASF, product name: IRGANOX 1010

Reaction terminator-2: Hindered amine-based light stabilizer, manufactured by BASF, product name: TINUVIN XT 855 μF Silanol crosslinking promoting catalyst: Octyl tin compound, manufactured by ADEKA, product name: ADK STAB OT-1

Light stabilizer: Hindered amine-based light stabilizer, manufactured by BASF, product name: TINUVIN XT 855 μF Softener: Paraffin-based process oil, manufactured by Idemitsu Kosan Co., Ltd., product name: Diana Process Oil μW-90

TP-1: Polypropylene-based resin (block type), manufactured by Japan Polypropylene Corporation, product name: Novatec EC 7

TP-2: Polyacetal resin, manufactured by Polyplastics Co., Ltd., product name: DURACON M25-44

TP-3: Polybutylene terephthalate-based resin, manufactured by Toray Industries, Inc., product name: TORAYCON 1401X06

TP-4: Polyamide-based resin, manufactured by Toray Industries, Inc., product name: Amilan CM1017

TP-5: Polystyrene-based resin, manufactured by CHI MEI CORPORATION: product name: POLYREX PH-88S Coloring agent: Color master batch, manufactured by Tokyo Printing Ink Mfg. Co., Ltd., product name: PEX3162 BLUE Examples 1 to 7 are examples in which the grafting step, the kneading step, and the dynamic crosslinking step are continuously performed and the thermoplastic resin-adding and kneading step is not performed, and in which TPE-1 (olefin-based one) and TP-1 (polypropylene-based resin) are used and the blending amounts and the like of the blending components are changed. Incidentally, Example 1 is an example in which a coloring agent is not blended, and Examples 2 to 7 are examples in which a coloring agent is blended. Further, Example 6 is an example in which a light stabilizer is blended and Example 7 is an example in which a softener is blended.

Example 8 is an example in which the grafting step, the kneading step, and the dynamic crosslinking step are continuously performed and the thermoplastic resin-adding and kneading step is not performed, and in which TPE-2 (styrene-based one) and TP-1 (polypropylene-based resin) are used and a coloring agent is blended.

Example 9 is an example in which the grafting step, the kneading step and the dynamic crosslinking step are continuously performed and the thermoplastic resin-adding and kneading step is not performed, and in which TPE-3 (polyester-based one) and TP-1 (polypropylene-based resin) are used and a coloring agent is blended.

Example 10 is an example in which the grafting step, the kneading step, and the dynamic crosslinking step are continuously performed and the thermoplastic resin-adding and kneading step is not performed, and in which Rubber-1 (ethylene propylene diene rubber) and TP-1 (polypropylene-based resin) are used and a coloring agent is blended.

Example 11 is an example in which the grafting step, the kneading step and the dynamic crosslinking step are continuously performed and the thermoplastic resin-adding and kneading step is not performed, and in which Rubber-2 (acrylic rubber) and TP-1 (polypropylene-based resin) are used and a coloring agent is blended.

Example 12 is an example in which the grafting step, the kneading step, and the dynamic crosslinking step are continuously performed and the thermoplastic resin-adding and kneading step is not performed, and in which TPE-1 (olefin-based one) and Rubber-1 (ethylene propylene diene rubber) are used in combination, TP-1 (polypropylene-based resin) is used as a thermoplastic resin and a coloring agent is blended.

Example 13 is an example in which the grafting step, the kneading step, and the dynamic crosslinking step are continuously performed and the thermoplastic resin-adding and kneading step is not performed, and in which TPE-1 (olefin-based one) and TP-2 (polyacetal resin) are used and a coloring agent is blended.

Example 14 is an example in which the grafting step, the kneading step, the dynamic crosslinking step, and the thermoplastic resin-adding and kneading step are continuously performed, and in which TPE-1 (olefin-based one) and TP-3 (polybutylene terephthalate resin) are used and a coloring agent is blended. TP-3 (polybutylene terephthalate resin) was mixed in an amount of 20 parts by weight in the kneading step of the second zone, and the remaining 50 parts by weight thereof was mixed in the thermoplastic resin-adding and kneading step of the fourth zone.

Example 15 is an example in which the grafting step, the kneading step, the dynamic crosslinking step, and the thermoplastic resin-adding and kneading step are continuously performed, and in which TPE-1 (olefin-based one) and TP-4 (polyamide-based resin) are used and a coloring agent is blended. TP-4 (polyamide-based resin) was mixed in an amount of 20 parts by weight in the kneading step of the second zone, and the remaining 50 parts by weight thereof was mixed in the thermoplastic resin-adding and kneading step of the fourth zone.

Example 16 is an example in which the grafting step, the kneading step, and the dynamic crosslinking step are continuously performed and the thermoplastic resin-adding and kneading step is not performed, and in which TPE-1 (olefin-based one) and TP-5 (polystyrene-based resin) are used and a coloring agent is blended.

Comparative Example 1 is an example of phenol crosslinking (complete crosslinking), Comparative Example 2 is an example in which a coloring agent is mixed in Comparative Example 1, and Comparative Example 3 is an example of peroxide crosslinking (partial crosslinking). Comparative Example 4 is an example in which the crosslinking agent (silane coupling agent) is not included in the composition of Example 1. Comparative Example 5 is an example in which the reaction initiator is not included in the composition of Example 1. Comparative Example 6 is an example in which water component is not included in the composition of Example 1.

For each Example and each Comparative Example, there were investigated the phase inversion, sea-island structure, maximum value (theoretical value) (parts by weight) of gel component (insoluble matter) of the island structure part, measured value (parts by weight) of gel component (insoluble matter) of the island structure part, gel fraction (%) of the island structure part, color difference value ($\Delta E^*ab$) due to a weatherable deterioration, color difference value ($\Delta E^*ab$) due to coloring, compression set (%), and remeltability. The results are shown in FIG. 4. The color difference value ($\Delta E^*ab$) due to a weatherable deterioration was measured in Examples 1 to 7 and Comparative Examples 1 to 6.

The presence or absence of the phase inversion and the presence or absence of the sea-island structure were confirmed through preparation of a thin film with an ultramicrotome (FC6: manufactured by Leica) and observation with a transmission electron microscope (H-7650: manufactured by Hitachi High-Technologies Corporation).

The maximum value (theoretical value) of the gel component (insoluble matter) of the island structure part is the blending amount (100 parts by weight) of TPE or rubber.

The measured value of the gel fraction of the island structure part was obtained in accordance with JIS K 6769: 2004. JIS K 6769: 2004 is a standard corresponding to ISO 15875-2: 2003.

The gel fraction (%) of the island structure part was calculated from [(Measured value (parts by weight) of gel component (insoluble matter) of island structure part/Maximum value (parts by weight) of gel component (insoluble matter) of island structure part)×100].

The color difference value ($\Delta E^*ab$) due to a weatherable deterioration was measured with a color difference meter (SM color computer SM-T: manufactured by Suga Test Instruments Co., Ltd.) in accordance with JIS Z 8781-4: 2013. JIS Z 8781-4: 2013 is a standard corresponding to ISO 11664-4: 2008. The color difference value ($\Delta E^*ab$) due to a weatherable deterioration is a color difference of the thermoplastic resin composition before and after the weatherable deterioration. Incidentally, the weatherable deterioration test was performed in accordance with JIS K 7350-2: 2008 B method, by irradiation with a xenon lamp at irradiance: 150 W/m$^2$ (wavelength region of 300 to 400 nm) under the conditions of a cumulative irradiation amount: 300 MJ/m$^2$ and a black panel temperature: 63±3° C. using a light-resistance testing machine (SC-700FP: manufactured by Suga Test Instruments Co., Ltd.). JIS K 7350-2: 2008 is a standard corresponding to ISO 4892-2: 2006.

The color difference value due to coloring, with regard to the colorability (color developing property) depending on the blending or non-blending of the coloring agent, was measured in accordance with JIS Z 8781-4: 2013, similarly to the above-mentioned color difference value due to a weatherable deterioration. The color difference value ($\Delta E^*ab$) due to coloring is a color difference value of the thermoplastic resin composition resulting from the blending of the coloring agent. Incidentally, the color difference values due to the coloring in Examples 2 to 16 and Comparative Examples 3 to 6 were measured relative to Example 1 (non-blending of coloring agent) and the color difference value due to the coloring in Comparative Example 2 was measured relative to Comparative Example 1 (non-blending of coloring agent). The larger the value of $\Delta E^*ab$ is, the better the colorability is.

Color difference value: ΔE*ab is defined as the Euclidean distance between coordinates in CIE 1976 L*a*b* color space, and indicates the color difference between two color stimuli calculated by the following equation.

$$\Delta E^*ab = [(\Delta L^*)^2 + (\Delta a^*)^2 + (\Delta b^*)^2]^{1/2}$$

Figure 5:
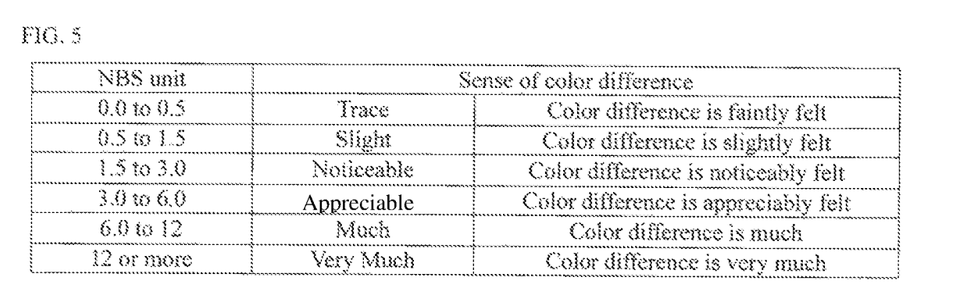
FIG. 5 is a table which shows ΔE*ab in terms of NBS unit and sense of color difference.

Also, the color difference value: ΔE*ab can be, as shown in FIG. 5, represented by the NBS unit and the sense of color difference (evaluation of the degree of sensory color difference) which are defined by the U.S. Bureau of Standardization. The numerical values in the column of the NBS unit in FIG. 5 are values of ΔE*ab calculated from the above equation.

The compression set was measured in accordance with JIS K 6262: 2013 A method (70° C.×22 h, 25% compression). JIS K 6262: 2013 is a standard corresponding to ISO 815-1: 2008 and ISO 815-2: 2008.

With regard to the remeltability, hot pressing was performed at 180° C. for 3 minutes for each Example and each Comparative Example, and the presence or absence of melting was confirmed. The case where it was melted was evaluated as "O" and the case where it was not melted was evaluated as "x".

In Examples 1 to 16, the phase inversion was "Yes", the sea-island structure was "Yes", and the gel fraction of the island structure part was 92 to 99%. Further, in Examples 1 to 16, the compression set was as small as 29 to 40%, and the remelting property was "O". Incidentally, in the case of the use for automobile parts, water blocking materials, construction materials, industrial members, etc., the compression set is preferably 50% or less and more preferably 40% or less. In Examples 1 to 16, the gel fraction of the island structure part is 92 to 99% and complete crosslinking is achieved by using a silane coupling agent, thus the compression set is as low as 29 to 40%, and they can be suitably used as automobile parts, water blocking materials, construction materials, industrial members, and the like.

With regard to the colorability, when Example 1 and Example 2 were compared, the color difference value (ΔE*ab) due to coloring in the case of blending 0.01 part by weight of the coloring agent relative to 100 parts by weight of TPE-1 was 5, the NBS unit was located between 3.0 and 6.0, and the sense of color difference was at a noticeable level, so that the colorability was excellent. Further, also for Examples 3 to 16, as compared with Example 1, the color difference value due to coloring was 4 to 6 and the colorability was excellent as Example 2.

Moreover, although not shown in FIG. 4, hardness was measured for Example 1 and Example 7 (softener-blended example). When Example 1 and Example 7 were compared, the hardness of Example 1 was D60 (measured by a type D durometer), and the hardness of Example 7 was A65 (measured by a type A durometer). Thus, the hardness of the thermoplastic resin composition can be lowered while maintaining the characteristics such as the color difference value due to coloring and the compression set. The hardness was measured in accordance with JIS K 6253-3: 2012. JIS K 6253-3: 2012 is a standard corresponding to ISO 7619-1: 2010.

In Examples 1 to 7 using a thermoplastic elastomer in which the main chain and the side chains are formed of saturated bonds, the color difference value (ΔE*ab) due to a weatherable deterioration was 2.1 to 2.8, and the color difference value due to a weatherable deterioration was small.

Comparative Example 1 is an example in which a thermoplastic elastomer (EPDM) having a double bond in the side chain is crosslinked with phenol, and the phase inversion was "Yes", the sea-island structure was "Yes", the gel fraction of the island structure part was 100%, the compression set was as small as 33%, and the remeltability was "O".

In Comparative Example 1, since EPDM is used, the color difference value (ΔE*ab) due to a weatherable deterioration was 13.2, and thus the color difference value due to a weatherable deterioration was large.

Comparative Example 2 is an example in which a coloring agent is blended in Comparative Example 1, and the phase inversion was "Yes", the sea-island structure was "Yes", the gel fraction of the island structure part was 100%, the compression set was as small as 35%, and the remeltability was "O". When Comparative Example 1 and Comparative Example 2 are compared, the color difference value (ΔE*ab) due to coloring in the case of blending 0.01 part by weight of the coloring agent relative to 100 parts by weight of Santoprene 201-64 was 0.8, the NBS unit was located between 0.5 and 1.5, and the sense of color difference was at a slightly felt level, which was inferior to the color difference value (ΔE*ab) of 5 due to coloring in Example 2. This indicates that the phenol itself used for the phenol crosslinking has a color tone and the colorability is low even when a coloring agent is blended. When the blending amount of the coloring agent is increased, the color difference value (ΔE*ab) due to coloring of the phenol-crosslinked thermoplastic resin composition can be increased, but it becomes difficult to color it lightly. In particular, in the CIE 1976 L*a*b*color space, it is very difficult to lightly color the phenol-crosslinked thermoplastic resin composition in the color opposite to the color of the phenolic crosslinking agent itself. Accordingly, the thermoplastic resin composition of the present Example can be colored in a light color while a phenol-crosslinked thermoplastic resin composition is difficult to color in such a color, and it is indicated that the composition of the present Example is excellent in the degree of freedom in coloring.

In Comparative Example 2, since EPDM is used, the color difference value (ΔE*ab) due to a weatherable deterioration was 14.2, and thus the color difference value due to a weatherable deterioration was large.

Comparative Example 3 is an example in which a thermoplastic elastomer (EPDM) having a double bond in a side chain is crosslinked with a peroxide, and the phase inversion was "Yes", the sea-island structure was "Yes", the gel fraction of the island structure part was 60%, the compression set was as large as 52%, and the remeltability was "O". Comparative Example 3 had a color difference value (ΔE*ab) due to coloring of 6 and was excellent in colorability, but the island structure part of the thermoplastic resin composition was crosslinked (partially crosslinked) by the peroxide crosslinking agent, so that the gel fraction of the island structure part was low, and the compression set was large.

In Comparative Example 3, since EPDM was used, the color difference value (ΔE*ab) due to a weatherable deterioration was 12.5, and thus the color difference value due to a weatherable deterioration was large.

Comparative Example 4 is an example in which a crosslinking agent (silane coupling agent) was not blended, and the phase inversion was "No", the sea-island structure was "No", and the compression set was as large as 88%, and remeltability was "O". Since crosslinking did not occur, the gel fraction of the island structure part was not able to be measured. Comparative Example 4 has a color difference value (ΔE*ab) due to coloring of 5 and is excellent in colorability, but the island structure part is not crosslinked and the compression set is large, so that it is not suitable for automobile parts, water blocking materials, construction materials, industrial members, and the like. The reason why the remeltability of Comparative Example 4 is "O" is that the obtained thermoplastic resin composition is a mixture of TPE-1, PO-1, and the like and has thermoplasticity.

Comparative Example 4 uses raw materials formed of saturated bonds, so that the color difference value ($\Delta E^*ab$) due to a weatherable deterioration was 2.7, and thus the color difference value due to a weatherable deterioration was small.

The comparative example 5 is an example in which a reaction initiator was not blended, and the phase inversion was "No", the sea-island structure was "No", and the compression set was as large as 90%, and remeltability was "O". Since crosslinking did not occur, the gel fraction of the island structure part was not able to be measured. Comparative Example 5 has a color difference value ($\Delta E^*ab$) due to coloring of 4 and is excellent in colorability, but the island structure part is not crosslinked and the compression set is large, so that it is not suitable for automobile parts, water blocking materials, construction materials, industrial members, and the like. The reason why the remeltability of Comparative Example 5 is "O" is that the obtained thermoplastic resin composition is a mixture of TPE-1, PO-1, and the like and has thermoplasticity.

Comparative Example 5 uses raw materials formed of saturated bonds, so that the color difference value ($\Delta E^*ab$) due to a weatherable deterioration was 2.4, and thus the color difference value due to a weatherable deterioration was small.

The Comparative Example 6 is an example in which a water component was not blended, and the phase inversion was "No", the sea-island structure was "No", and the compression set was as small as 12%, but remeltability was "X". Comparative Example 6 had a color difference value ($\Delta E^*ab$) due to coloring of 5 and was excellent in colorability, but since remelting was impossible, it was not able to be remolded and had a low degree of freedom in molding. The reason why the compression set of Comparative Example 6 was small is that the obtained thermoplastic resin composition caused overall crosslinking without forming a sea-island structure, and the resin composition was not a thermoplastic resin composition having an island structure, and therefore, remolding through remelting was not able to be performed.

Comparative Example 6 uses raw materials formed of saturated bonds, so that the color difference value ($\Delta E^*ab$) due to a weatherable deterioration was 2.5, and thus the color difference value due to a weatherable deterioration was small.

Thus, the thermoplastic resin compositions obtained by Examples of the present invention are excellent in colorability and mechanical properties, and can be remolded by remelting, so that they are suitable for automobile parts, water blocking materials, construction materials, and industrial members. Furthermore, the use of a thermoplastic elastomer in which the main chain and side chains are formed of saturated bonds can make a weatherable deterioration less likely to occur.

In one aspect of the present invention, an object is to provide a thermoplastic resin composition which is excellent in mechanical properties and colorability, is capable of molding through remelting, and in addition, hardly causes a weatherable deterioration, in use applications requiring weatherability such as automobile parts, water blocking materials, construction materials, industrial members, and the like. As one of technical means for solving the object, a method for producing a thermoplastic resin composition which has the following characteristics can be mentioned.

Characteristics

A method for producing a thermoplastic resin composition, comprising:

a kneading step of kneading a thermoplastic elastomer having an alkoxysilyl group and formed of saturated bonds, in which the alkoxysilyl group is grafted to the thermoplastic elastomer wherein the main chain and the side chains are formed of saturated bonds, and a thermoplastic resin wherein the main chain and the side chains are formed of saturated bonds, in a melt state in a kneading machine; and a dynamic crosslinking step of adding a water component into the kneading machine, forming a silanol group by a hydrolysis reaction of the alkoxysilyl group in the thermoplastic elastomer having an alkoxysilyl group and formed of saturated bonds and the water component in the kneading machine, and subsequently forming a siloxane bond by a condensation reaction between the silanol groups, wherein the thermoplastic resin composition obtained by the dynamic crosslinking step has a sea-island structure.

The present invention has been described in detail with reference to particular embodiments, but it will be apparent to those skilled in the art that various changes and modifications can be made without departing from the spirit and scope of the present invention.

The present application is based on Japanese Patent Application No. 2017-064300 filed on Mar. 29, 2017 and Japanese Patent Application No. 2017-235926 filed on Dec. 8, 2017 and the entire contents are incorporated herein by reference. Also, all the references cited herein are incorporated as a whole.

The invention claimed is:

1. A thermoplastic resin composition comprising a sea-island structure,
    wherein an island structure part of the sea-island structure contains a thermoplastic elastomer cross-linked by a siloxane bond and a sea structure part of the sea-island structure contains a thermoplastic resin,
    wherein a gel fraction (in accordance with JIS K 6769: 2004/ISO-15875-2: 2003) of the island structure part is 90% or more, and
    wherein a weight of the thermoplastic resin is 30 to 70 parts by weight relative to 100 parts by weight of the thermoplastic elastomer, and
    wherein the thermoplastic elastomer is at least one selected from the group consisting of styrene-based thermoplastic elastomers (TPS), hydrogenated styrene-based thermoplastic elastomers, vinyl chloride-based thermoplastic elastomers (TPVC), polyurethane-based thermoplastic elastomers (TPU), polyester-based thermoplastic elastomers (TPC), polyamide-based thermoplastic elastomers (TPA), polybutadiene-based thermoplastic elastomers, and fluorine-based thermoplastic elastomers (TPF).

2. The thermoplastic resin composition according to claim 1,
    wherein the thermoplastic elastomer comprises a main chain and side chains, both formed of saturated bonds, and
    wherein the thermoplastic resin comprises a main chain and side chains, both formed of saturated bonds.

3. The thermoplastic resin composition according to claim 1, wherein a viscosity of the thermoplastic elastomer cross-linked by the siloxane bond is larger than a viscosity of the thermoplastic resin.

4. The thermoplastic resin composition according to claim 1,
wherein the sea structure part of the sea-island structure is remeltable.

5. The thermoplastic resin composition according to claim 1,
wherein a color difference value: ΔE*ab (in accordance with JIS Z 8781-4: 2013/ISO 11664-4: 2008) of the thermoplastic resin composition is 1.5 or more, and
wherein the color difference value is due to coloring of the thermoplastic resin composition in the case of blending 0.01 part by weight of a coloring agent relative to 100 parts by weight of the thermoplastic elastomer.

6. The thermoplastic resin composition according to claim 1,
wherein the thermoplastic resin is a crystalline thermoplastic resin.

7. The thermoplastic resin composition according to claim 2,
wherein the thermoplastic resin in which the main chain and the side chains are formed of saturated bonds further comprises an olefin-based resin.

8. The thermoplastic resin composition according to claim 7,
wherein the olefin-based resin is a polypropylene-based resin.

9. The thermoplastic resin composition according to claim 2,
wherein the thermoplastic elastomer in which the main chain and the side chains are formed of saturated bonds further comprises an ethylene/α-olefin-based copolymer.

10. The thermoplastic resin composition according to claim 1,
wherein a color difference value: ΔE*ab (in accordance with JIS Z 8781-4: 2013/ISO 11664-4: 2008) of the thermoplastic resin composition after a weatherable deterioration is 0 or more and 3 or less, and
wherein the weatherable deterioration is performed in accordance with JIS K 7350-2: 2008 B method, by irradiation with a xenon lamp at irradiance of 150 W/m$^2$ in a wavelength region of 300 to 400 nm under the conditions of a cumulative irradiation amount of 300MJ/m$^2$ and a black panel temperature of 63±3° C.

11. The thermoplastic resin composition according to claim 1,
wherein the thermoplastic resin composition is used as a joint material for building materials, a water blocking material for building materials, an interior material for vehicles, an exterior material for vehicles, or an industrial hose material.

12. A thermoplastic resin composition comprising a sea-island structure,
wherein an island structure part of the sea-island structure contains a thermoplastic elastomer cross-linked by a siloxane bond and a sea structure part of the sea-island structure contains a thermoplastic resin,
wherein a gel fraction (in accordance with JIS K 6769: 2004/ISO-15875-2: 2003) of the island structure part is 90% or more,
wherein a weight of the thermoplastic resin is 30 to 70 parts by weight relative to 100 parts by weight of the thermoplastic elastomer, and
wherein the thermoplastic resin is at least one selected from the group consisting of polyacetal resins (POM), polyamide-based resins (PA), polyester-based resins, polystyrene-based resins (PS), polycarbonate-based resins (PC), and polyvinyl chloride-based resins (PVC).

13. A thermoplastic resin composition comprising a sea-island structure,
wherein an island structure part of the sea-island structure contains a thermoplastic elastomer cross-linked by a siloxane bond and a sea structure part of the sea-island structure contains a thermoplastic resin,
wherein a gel fraction (in accordance with JIS K 6769: 2004/ISO-15875-2: 2003) of the island structure part is 90% or more,
wherein a weight of the thermoplastic resin is 30 to 70 parts by weight relative to 100 parts by weight of the thermoplastic elastomer,
wherein the thermoplastic elastomer comprises a main chain and side chains, both formed of saturated bonds,
wherein the thermoplastic resin comprises a main chain and side chains, both formed of saturated bonds,
wherein the thermoplastic resin composition does not contain an oil.

* * * * *